Figure 7:
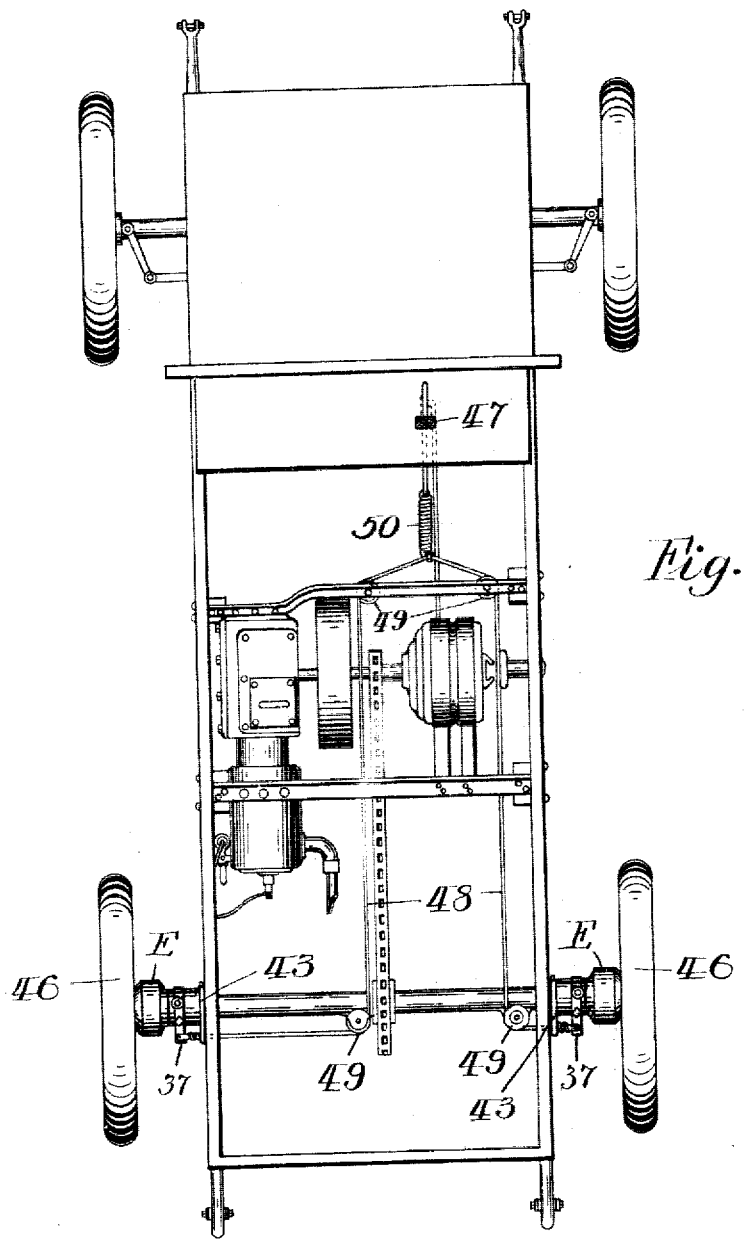

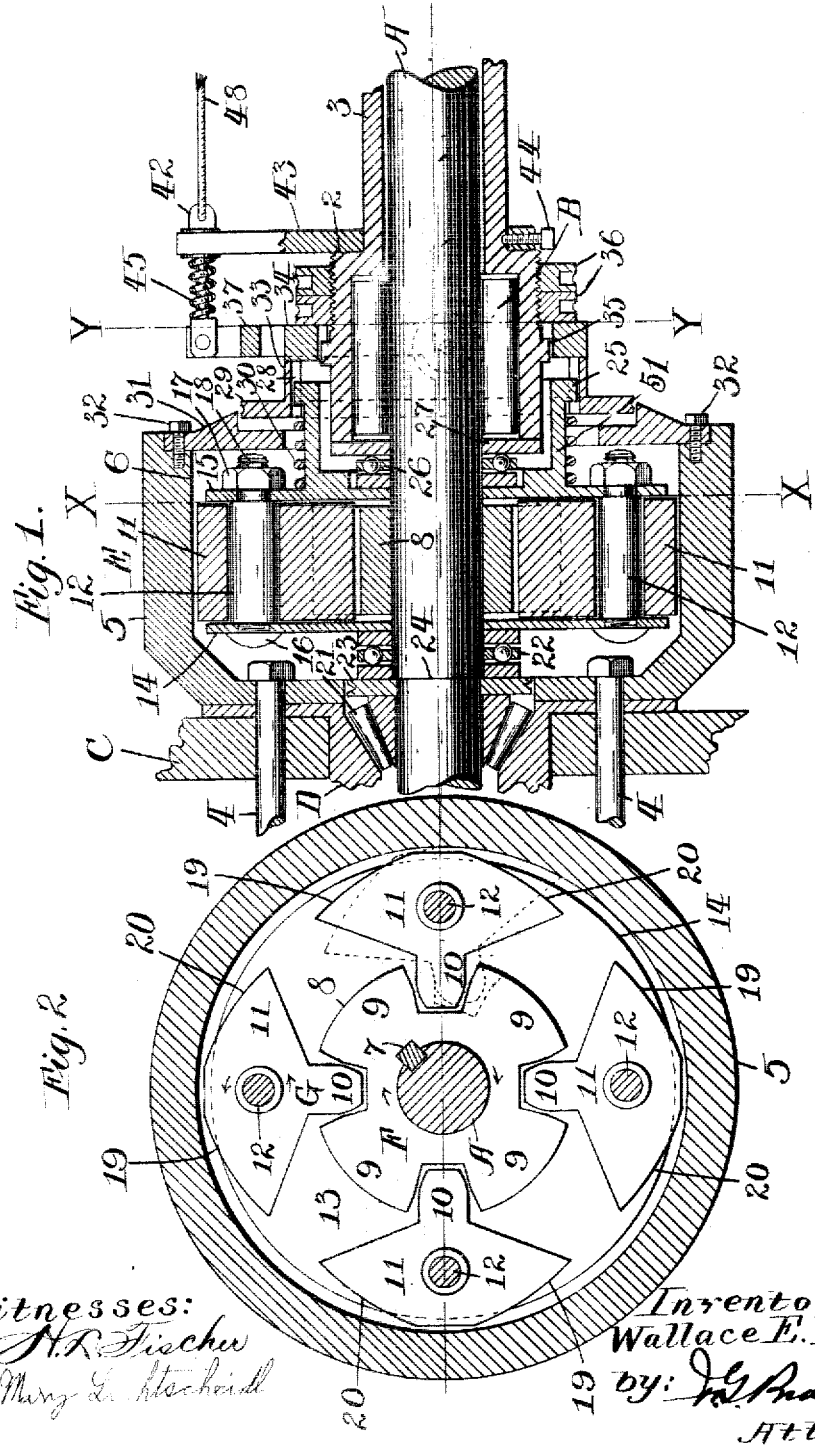

No. 851,197. PATENTED APR. 23, 1907.
W. E. BELT.
POWER TRANSMISSION.
APPLICATION FILED JULY 23, 1906.
3 SHEETS—SHEET 2
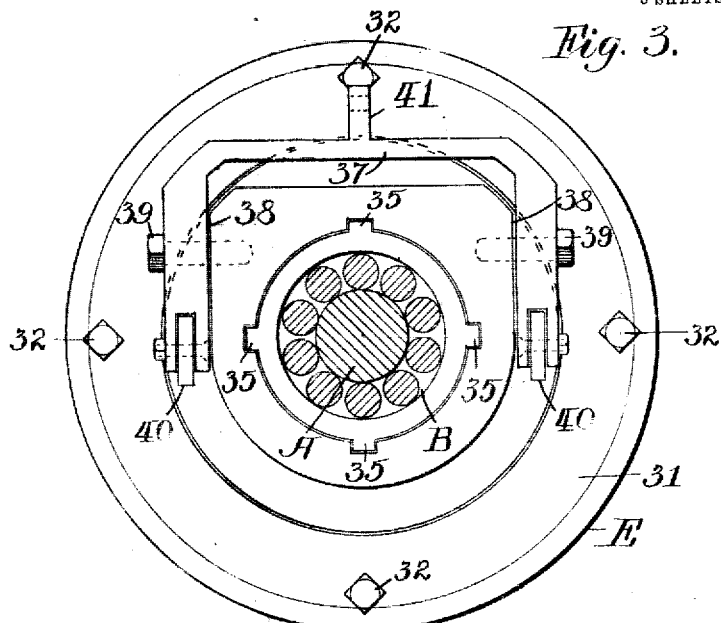
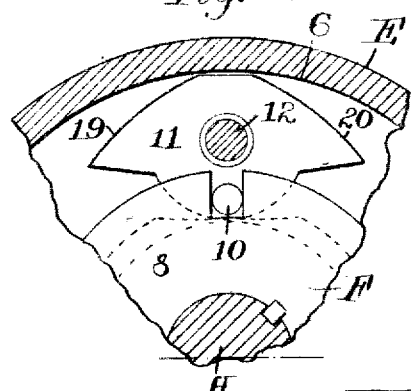
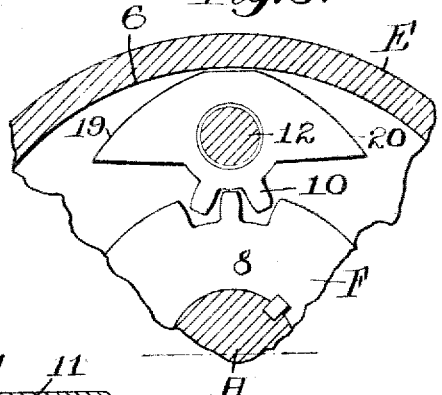
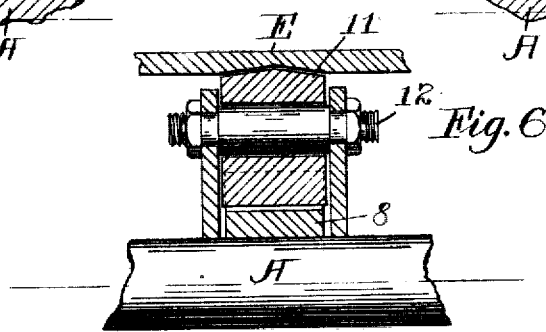
Witnesses:
H. L. Fischer.
Mary Lichtscheidl
Inventor:
Wallace E. Belt,
by: J. G. Bradbury.
Attorney.

No. 851,197. PATENTED APR. 23, 1907.
W. E. BELT.
POWER TRANSMISSION.
APPLICATION FILED JULY 23, 1906.

3 SHEETS—SHEET 3.

Witnesses:
H. D. Fischer
Mary Lichtscheidl

Inventor:
Wallace E. Belt,
by: W. G. Bradbury
Attorney.

UNITED STATES PATENT OFFICE.

WALLACE E. BELT, OF DODGE CENTER, MINNESOTA.

POWER TRANSMISSION.

No. 851,197.  Specification of Letters Patent.  Patented April 23, 1907.

Application filed July 23, 1906. Serial No. 327,265.

*To all whom it may concern:*

Be it known that I, WALLACE E. BELT, a citizen of the United States, residing at Dodge Center, in the county of Dodge and State of Minnesota, have invented a new and useful Improvement in Power Transmission, of which the following is a specification.

My invention relates to that class of power transmission which is adapted for use on automobiles and other vehicles.

The object of my invention is to provide simple and effective mechanism for differentiating motion between driving and driven elements, which is positive in action and equally effective when the direction of the motion between said elements is reversed, and further to provide means by which said motion may be retarded when desired.

In the accompanying drawings forming part of this specification my invention is illustrated as applied to a motor vehicle in which by its use a single part axle or shaft may be employed.

It is obvious that this invention may be applied to other uses than to self propelled vehicles and I do not wish to be understood as confining myself to this use alone.

In the drawings Figure 1 is a longitudinal central section of my invention. Fig. 2 is a transverse section of the same on the line X X of Fig. 1. Fig. 3 is an enlarged transverse section on the line Y Y of Fig. 1. Fig. 4 is a detail view in cross section of a modified form of part of my invention. Figs. 5 and 6 are similar views of other modified forms of the improvement, and Fig. 7 is a plan view showing my invention applied to the running gear of an automobile.

A represents the axle or drive shaft of a self propelled vehicle to which the power is supplied from the motor or to the wheels, said shaft being mounted in roller bearings such as illustrated by the parts B in Fig. 1 which run in the enlarged ends of the casing 3 surrounding said shaft. Upon the power shaft is loosely journaled at each end a wheel C and is carried by the hub D of said wheel is my improved power transmitting mechanism E which is clearly illustrated in detail by the enlarged views of the drawings.

To the inner end of the hub or other part to be driven is fastened by means of bolts 4 a drum 5 which is provided with an inner cylindrical friction surface 6 on its flange which is concentric with the drive shaft. On the shaft is fastened by the use of a key 7 or other means a pinion 8 having teeth 9 in mesh with corresponding teeth 10 formed on the inner ends of friction clutch levers 11. Each of the friction clutch levers, (four in number being shown although any suitable number may be provided) is mounted to swing on a pivot 12 which is carried by a cage 13. This cage has a pair of rings 14 and 15 which are loosely mounted on the shaft and between which the pinion and clutch levers are carried. The pivots 12 are in the form of bolts passing through said rings one end of each bolt being threaded and riveted or otherwise fastened at 16 over the ring 14 and the other end passing through the ring 15 and provided with a nut 17 and key 18 by which it is secured in place.

Each of the levers 11 has cam surfaces 19 and 20 extending in opposite directions and adapted to be moved in frictional contact with the friction surface 6 of the drum. Normally and when the shaft is at a standstill then the levers are in inactive position as illustrated in Fig. 2, that is the cam surfaces 19 and 20 are out of frictional contact with the rim of the drum. When the shaft is turned in the direction of the arrows F, see Fig. 2, then a simultaneous swinging motion is given to the levers in the direction of the arrows G so that the cam surfaces 20 of the several friction clutch levers are moved in frictional contact with the inner surfaces of the drum to carry the latter along and thus drive the wheel from the shaft and in the same direction as the latter. When the motion of the axle is reversed, that is, is driven in an inverse direction to the arrows then a reverse swinging motion is given to the friction clutch levers, that is the latter are swung in an inverse direction to the arrow G to cause the cam surfaces 19 to move in frictional engagement with the inner surface of the rim of the drum, to rotate the latter and consequently the wheel with the shaft and in the same direction that is, in an inverse direction to the arrows F.

From the foregoing it will be seen that the power of the shaft A is almost instantly transmitted to the wheel to be driven and in the same direction in which said shaft is rotated.

When the most obtuse angle of the notch in the pinion comes in parallel contact with the flat surface of a tooth at the time when the opposite friction surface engages with the drum, a broad surface contact between the teeth is produced which causes the parts to firmly engage each other.

When the power transmission as described is employed on automobiles and as long as the vehicle moves in a straight line, either forward or backward both drive wheels turn together, but in case the vehicle travels around a curve then the outer wheel releases from the friction levers so that the vehicle readily and easily moves forward. As soon as the vehicle again shifts to a straight course the released friction levers are moved immediately back into a locking or active position. There are conditions under which the levers are inactive, to wit: When for any reason both rear carriage wheels are revolving faster than the shaft, such as when going down hill with reduced power, and on the level when suddenly withdrawing the power.

The hub D of the wheel to be driven is provided with a roller bearing 21 and between said bearing and the cage 13 is a thrust bearing 22 and a drip plate 23, the latter abutting against a shoulder 24 on the drive shaft. The ring 15 is provided with a circular shoulder 51, the outer end of which has spleens 25. Between the cage 13 and the end of the casing 3 is another thrust bearing 26, one of the wear plates 27 of which is of sufficient diameter to impinge against the enlarged end 2.

Grooved at 28 to admit the spleens 25 is a clutch member 29 and between this clutch member and the ring 15 is an expansion helical spring 30 coiled around the shoulder 24, which presses against the cage, and the clutch member to prevent said cage rotating with the shaft until the clutch levers have engaged the drum. The clutch member 29 adjoins the clutch engaging member 31, the latter being fastened to the drum by means of bolts 32. The friction between the clutch member 29 and the support 34 (to be hereinafter described) causes the cage not to revolve when starting.

When the shaft A is at rest or revolving slower than the wheel and the brake is set, the connection through the clutch member 29, spleens 25, collar 24, cage 13, clutch levers and pinion 8 tends to retard the movement of the drum and the wheel with which it is connected.

Impinging against the end of the shoulder 33 on the clutch member 29 is a supporting ring 34 which is feathered at 35 upon the enlarged end 2 of the casing 3. This supporting ring is adjusted to vary the friction between the clutch member 29 and the support 34, and limits the movement of the clutch member 29 (caused by the spring 30) by means of lock nuts 36 on said enlarged end 2. The supporting ring carries a yoke 37 which is pivoted to its sides 38 by means of bolts 39. In effect this yoke is a lever, the work ends of its arms carrying anti friction rollers 40 which are adapted to impinge against the face of the clutch member 29 to set it, and its work end or arm 41 being attached to the shift rod 42. This rod 42 works freely through a guide 43 which is fastened on the casing 3 by a set bolt 44 and is provided with an expansion spring 45 which returns the lever to normal position as shown in Fig. 1 when the clutch member 29 is out of operation. It is understood that by turning one of the locknuts 36 any desired tension may be given to the spring 30 and by turning the other one, the nuts are interlocked on the casing.

Various connections may be made between the pinion 8 and the friction clutch levers 11, for instance as shown in Figs. 4 and 5 and I do not limit myself to any particular construction of the connection between said pinion and levers. The cam surfaces 19 as indicated in Fig. 1 may be straight or V shaped as illustrated in Fig. 6, it being understood that in the latter case the inner surface of the rim of the drum is correspondingly shaped to insure proper frictional contact between the cam surfaces 19 and 20, and the inner surface of the rim of the drum E.

In operation when the clutch member 29 is set, the levers 11 are locked to the drum which enables the application of the main braking power of the vehicle to be communicated directly with the wheels. A power transmission is employed on each rear drive wheel 46 as shown in Fig. 7 and as long as the vehicle moves in a straight line either forward or backward, both drive wheels turn together. In case the vehicle turns around a curve the friction levers 11 of the power transmission for the outer drive wheel become released, while the friction levers 11 of the power transmission for the inner drive wheel remain locked on in active position, so that the vehicle readily and easily passes around the curve. As soon as the vehicle again reaches a straight course, the friction levers are moved immediately back into a locking or active position. When for any reason both rear carriage wheels are revolving faster than the shaft as in going down hill with reduced power, and also on the level when suddenly withdrawing the power, such as by depressing the transmission lever, the brakes on the transmission mechanism of both wheels may be set by means of the lever 47 which is connected by the cables 48 to the shift rods 42. These cables travel over guide pulleys 49 on the frame of the machine and have interposed therein a draw spring 50, the tendency of which is to give after the springs 45 have been depressed and the brakes set by the forward movement of the lever 47. A gradual engagement between the parts is produced by bringing the brake into active position before the power is thrown off.

By the arrangement described it will be noted that the rear shaft of the vehicle may be solid or in one piece, thus giving more strength to the vehicle, and that the corresponding drive wheel of the vehicle may be removed and access to the power transmission thus had. As the power transmissions for both drive wheels of the vehicles are driven from the same source (the shaft A as shown) it is evident that neither drive wheel can spin around while the other is at a stand still and the vehicle cannot skid either in starting or when turning corners, nor is the vehicle liable to travel a zigzag course on a slippery roadway.

In accordance with the patent statutes I have described the principle of operation of my invention together with the apparatus which I now consider to represent the best embodiment thereof, but I desire to have it understood that the apparatus shown is only illustrative and that the invention can be carried out by other means and applied to uses other than those for driving automobiles.

Having described my invention what I claim as new and desire to protect by Letters Patent is:

1. In combination with the hub of a wheel to be driven provided with a friction surface, a drive shaft, and a system of friction clutch levers each provided with double cam surfaces and means for causing them to automatically impinge against said friction surface and transmit motion from said shaft and for holding the clutch levers inoperative when the driven element rotates at a greater speed than the driving element.

2. A power transmission, comprising in combination with the hub of a wheel to be driven, a friction drum on said hub, a drive shaft, a suitable cage, a pinion on said shaft, a plurality of clutch levers fulcrumed on said cage and in mesh with said pinion, each of said levers provided with double cams adapted to impinge against the friction surface of said drum when said shaft revolves in either direction, and means for retarding the movement of said cage.

3. A power transmission, comprising in combination with the hub of a wheel to be driven, a friction drum on said hub, a drive shaft, on which said hub is freely journaled, a suitable cage, a pinion on said shaft, a plurality of double cams adjoining the friction surface of said drum, means in mesh with said pinion for automatically holding said cams inoperative when the driven element rotates faster than the driving element, a thrust bearing between said cage and hub, means for retarding the movement of said cage and means for adjusting said retarding means for the purposes specified.

4. A power transmission, comprising a drive shaft, a pinion secured on the said shaft, a cage, a plurality of friction clutch levers fulcrumed on the said cage and in mesh with the said pinion, a drum connected with the part to be driven and adapted to be frictionally engaged in the inner surface of its rim by the said clutch levers, a thrust bearing for the said cage, and a spring retarding the movement of said cage.

5. A power transmission, comprising a drive shaft, a pinion secured on the said shaft, a cage, a plurality of friction clutch levers fulcrumed on the said cage and in mesh with the said pinion, a drum connected with the part to be driven and adapted to be frictionally engaged in the inner surface of its rim by the said clutch levers, and a thrust bearing for the said cage.

6. A power transmission, comprising a drive shaft, a pinion secured on said shaft, a cage, a plurality of friction clutch levers fulcrumed on said cage and in mesh with said pinion, a drum connected with the part to be driven and adapted to be frictionally engaged in the inner surface of its rim by the said clutch levers, and a spring tending to prevent said cage from rotating with the shaft on starting the latter.

7. A power transmission, comprising a pinion on the driving part, a drum connected with the part to be driven and a plurality of friction clutch levers in mesh with said pinion each being provided with a double impinging surface for engagement with said drum in either direction.

8. A power transmission, comprising a driven shaft, a pinion secured on said shaft, a cage, a plurality of friction clutch levers fulcrumed on said cage, in mesh with said pinion each being provided with a double impinging surface, and a drum connected with the part to be driven and adapted to be frictionally engaged at the inner surface of its rim by impinging surfaces in either direction.

9. A power transmission, comprising a drive shaft, a member secured thereon, a cage around said shaft, a plurality of friction clutch levers each provided with a double impinging surface, fulcrumed on said cage and connected with the said member for the latter to impart a swinging motion to said levers, and a drum on the part to be driven and adapted to be engaged in either direction at the inner surface of its rim by said impinging surface on said levers.

10. A power transmission, comprising a drive shaft, a member secured thereon, a cage around said shaft, a plurality of friction clutch levers fulcrumed on said cage, and connected with said member for the latter to impart a swinging motion to the said levers, each of said friction clutch levers having double cam surface extending in opposite directions, and a drum on the part to be driven and adapted to be engaged at the inner surface of its rim by said cam surfaces in either direction of rotation.

11. In combination with a hub D of a wheel to be driven, a friction drum E carried by said hub, a drive shaft A on which said hub is freely journaled, a casing 3 containing said shaft, a cage 13 within said drum, a pinion 8 on said shaft, a plurality of clutch levers 11 fulcrumed on said cage, in mesh with said pinion and provided with double cam surfaces 19 and 20, thrust bearings 22 and 26 between the hub and casing and said cage, a thrust spring 30, and means for adjusting the tension of said spring.

12. A power transmission, comprising in combination with the part to be driven, a driving part, clutching means between said parts provided with means for causing the same to automatically transmit motion between said parts in either direction and to become inoperative when the driven element rotates at a greater speed than the driving element, a brake element carried by said driving element and means for setting said brake.

13. A power transmission, comprising in combination with the part to be driven provided with friction surface, a driving part, a system of friction clutch levers, carried by said driving part, and provided with means for causing them to automatically impinge against said friction surface and transmit motion to said part to be driven in either direction, and for holding them inoperative when the driven element rotates at a greater speed than the driving element, a brake element also adapted to impinge against said friction surface, and means for setting said brake element.

14. A power transmission, comprising in combination with the part to be driven, a driving part, clutching means provided with a double cam to engage the part to be driven in either direction, means rotating with said driving part and connected with said clutching means for differentiating motion between said driving and driven parts, a brake carried by said driving part, and means for setting said brake.

15. In combination with a hub D of a wheel to be driven, a friction drum E carried by said hub, a drive shaft A on which said hub is freely journaled, a casing containing said shaft, a cage 13 within said drum, a pinion 8 on said shaft, a plurality of clutch levers 11 fulcrumed on said cage, in mesh with said pinion and provided with double cam surfaces 19 and 20; thrust bearings 22 and 26 between the hub and casing and said cage, a thrust spring 30, a brake 29 coacting with said drum and feathered on said cage, a support 34 feathered on said casing, a lever 37 fulcrumed on said support, its work end being adapted to impinge against said brake, and means for throwing said lever to set said brake.

In testimony whereof I have signed my name to this specification in the presence of two subscribing witnesses.

WALLACE E. BELT.

Witnesses:
MARY LICHTSCHEIDL,
F. G. BRADBURY.